Figures 3, 4:
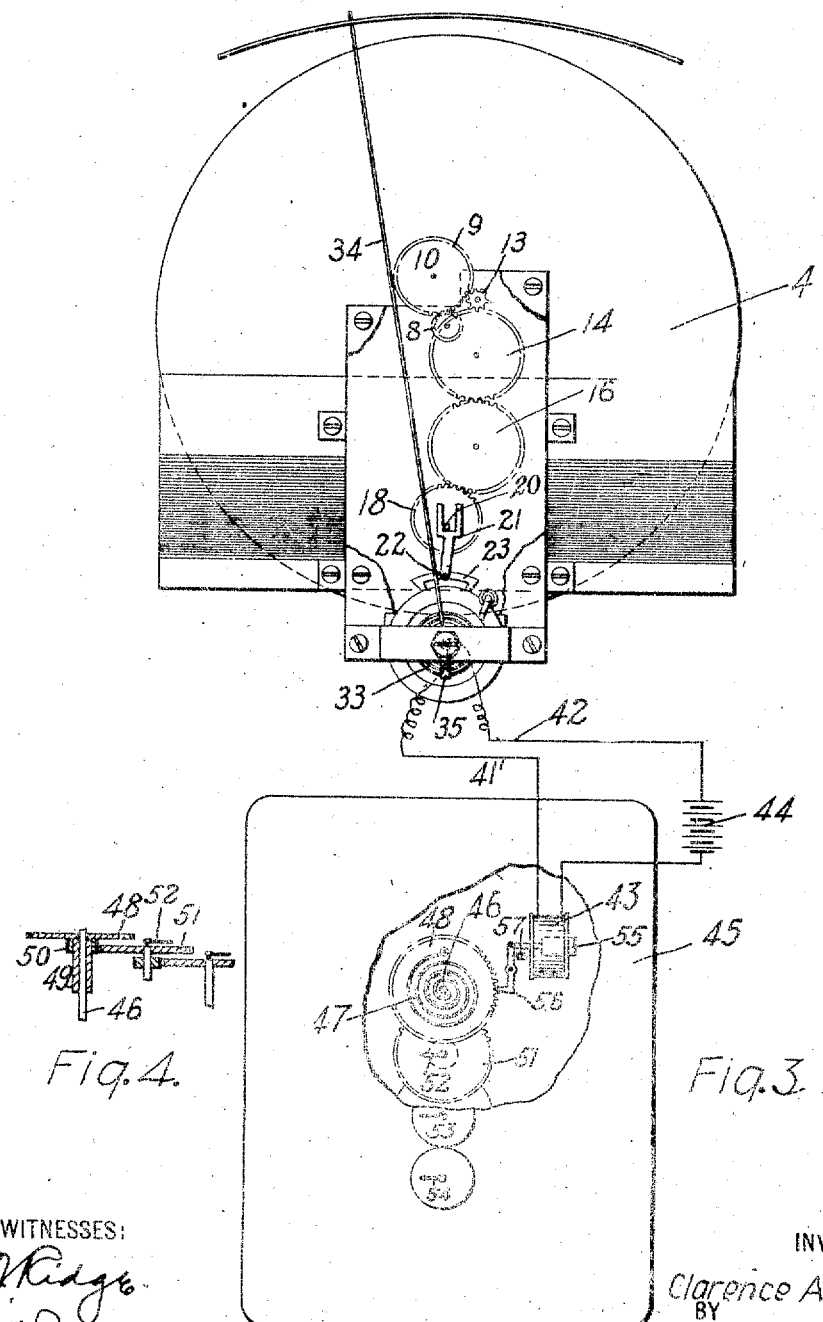

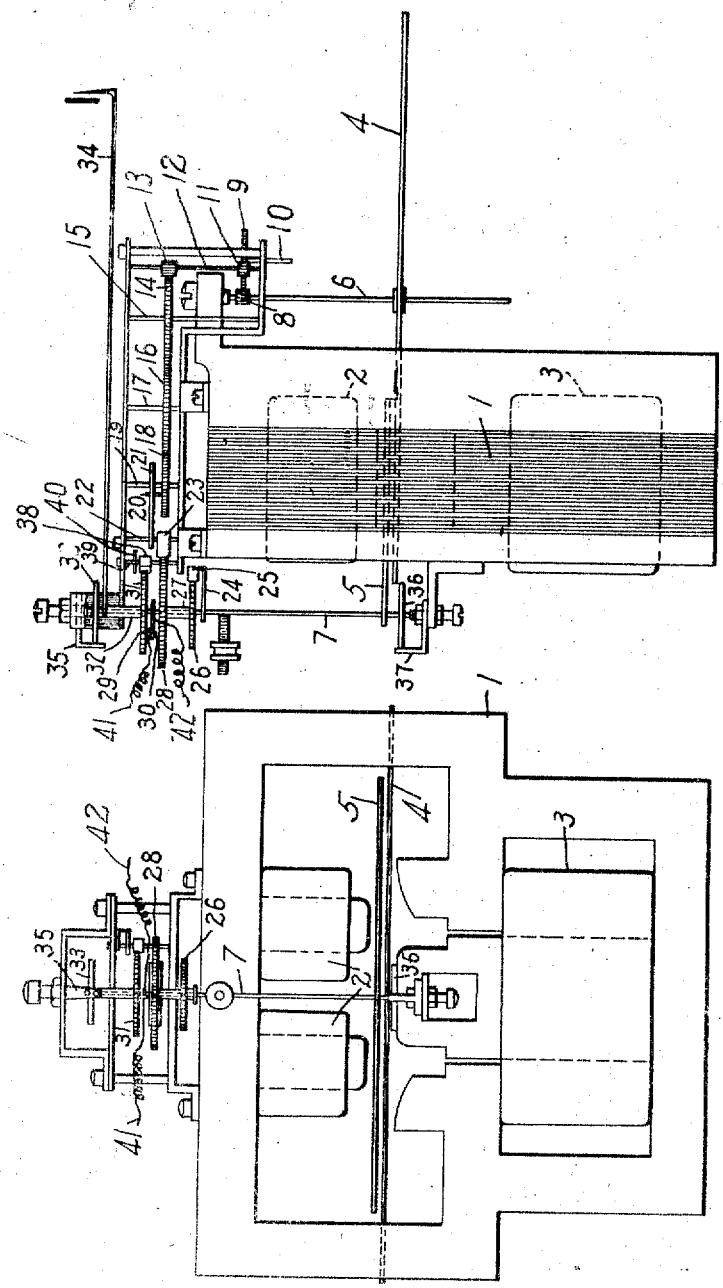

C. A. BODDIE.
MAXIMUM DEMAND METER.
APPLICATION FILED OCT. 2, 1914.

1,206,294.

Patented Nov. 28, 1916.
2 SHEETS—SHEET 2.

WITNESSES:

INVENTOR
Clarence A. Boddie.
BY
ATTORNEY

UNITED STATES PATENT OFFICE.

CLARENCE A. BODDIE, OF PITTSBURGH, PENNSYLVANIA, ASSIGNOR TO WESTINGHOUSE ELECTRIC AND MANUFACTURING COMPANY, A CORPORATION OF PENNSYLVANIA.

MAXIMUM-DEMAND METER.

1,206,294.     Specification of Letters Patent.     Patented Nov. 28, 1916.

Application filed October 2, 1914. Serial No. 864,585.

*To all whom it may concern:*

Be it known that I, CLARENCE A. BODDIE, a citizen of the United States, and a resident of Pittsburgh, in the county of Allegheny and State of Pennsylvania, have invented a new and useful Improvement in Maximum-Demand Meters, of which the following is a specification.

My invention relates to electrical measuring instruments and particularly to maximum-demand meters.

The object of my invention is to provide a device for indicating the time of the occurrence of a maximum demand.

Heretofore, the time of the occurrence of a maximum demand could be determined only by means of a clock-controlled maximum-demand meter that recorded the maximum demand during predetermined intervals of time.

My copending United States applications, Serial Nos. 687,395 filed March 30, 1912, and 771,883, filed June 5, 1913, disclose indicating maximum-demand meters that do not require the use of clock mechanisms. However, these devices do not indicate or record the time of the occurrence of a maximum demand.

In my present invention, I provide a maximum-demand meter similar to those shown in above mentioned applications, and I provide also a clock that is controlled by the maximum-demand meter for indicating on a dial, the day, hour and minute of the occurrence of a maximum demand.

Figure 1 of the accompanying drawings is a rear elevational view of a maximum-demand meter embodying my invention; Fig. 2 is a side elevational view of the maximum-demand meter shown in Fig. 1; Fig. 3 is a top plan view having parts broken away of a maximum-demand meter embodying my invention, and Fig. 4 is a detail view of a time-indicating device embodied in my invention.

A magnetizable core member 1, having current coils 2 and a voltage coil 3 wound thereon, is provided with a main rotatable armature 4 and an auxiliary rotatable armature 5. The armatures 4 and 5 are mounted, respectively, on shafts 6 and 7 and are disposed in the air gap of the magnetizable member 1 between the current and voltage coils of the same.

A pinion 8, mounted upon the shaft 6, engages a gear wheel 9 mounted on a shaft 10. The gear wheel 9 engages a pinion 11 mounted on a shaft 12, and a pinion 13, also mounted on the shaft 10, engages a gear wheel 14 mounted on a shaft 15. The gear wheel 14 engages a gear wheel 16 mounted on a shaft 17, and the gear wheel 16 engages a gear wheel 18 mounted on a shaft 19. A pin 20 is mounted on the face of the gear wheel 18 and is surrounded by an eccentric strap 21 that is securely mounted on a shaft 22 on which is also mounted a double palette 23. The gear wheels 9, 14, 16 and 18 form a gear train for controlling the palette 23, as hereinafter more fully set forth.

An arm 24 that is attached to the shaft 7, carries a pawl 25 to engage a ratchet wheel 26 which is mounted on a sleeve 27. The sleeve 27 loosely surrounds the shaft 7 and has mounted thereon a ratchet wheel 28 that is engaged by the double palette 23. An arm 29, constructed of some insulating material, is also attached to the shaft 7 and engages a pin 30 that projects from the under side of a ratchet wheel 31. The ratchet wheel 31 is mounted on a second sleeve 32 that also loosely surrounds the shaft 7. The sleeve 32 has one end of a coil spring 33 and a maximum-demand pointer 34 attached thereto. The other end of the spring 33 is attached to a stationary member 35. A second coil spring 36 has its inner end attached to the shaft 7 and its outer end to a stationary member 37. A pawl 38, that is mounted on a shaft 39, is maintained in engagement with the ratchet wheel 31 by a small coil spring 40.

Conductors 41 and 42 are respectively connected to the pin 30 and to a contact piece (not shown) on the insulating arm 29. The conductors 41 and 42 are so connected as to form a circuit comprising the winding of an electromagnet 43 and a battery 44. A clock device 45 comprises a clock mechanism (not shown) having a main shaft 46 that is actuated by the clock mechanism in a manner similar to the operation of clocks of well known construction. A coil spring 47 is attached, at its inner end, to the shaft 46 and, at its outer end, to a gear wheel 48 that is mounted on a sleeve 49 which, in turn, is loosely mounted on the shaft 46. A pinion 50 is mounted on the sleeve 49 and engages a gear wheel 51 that operates a pointer 52 for indicating one division of the time of a maximum demand, such as the day of the month. The pointers 53 and 54 are connected by gear wheels (not shown) to the pointer 52 and they are arranged to indicate, respectively, the hour and the minute of the occurrence of a maximum demand. The electromagnet winding 43 is disposed around a movable core member 55 that operates a holding or restraining device 56. The restraining device 56 is normally held in engagement with the gear wheel 48 by a spring 57.

When the coils 2 and 3 are connected to an electrical circuit (not shown) for the purpose of determining the maximum flow of energy in the circuit and the time at which the maximum occurs, the armature 4 rotates at a speed that is proportional to the product of the voltage impressed upon the coils 2 and the current traversing the coil 3. The armature 5 also tends to rotate but is prevented from so doing by the palette 23. Since the palette 23 is controlled by the eccentric strap 21 and the latter is controlled by the armature 4, the palette is operated at a rate that is substantially proportional to the speed of the armature 4. Thus, the armature 5 rotates the shaft 7, and the arm 29 engages the pin 30 to rotate the sleeve 32 and the pointer 34 to indicate the root-mean-square value of the power traversing the circuit to which the instrument is connected. When the circuit to which the instrument is connected is interrupted, the armature 5, by reason of the spring 36, returns to its initial position, but the spring 33, by reason of the coöperating pawl 38 and ratchet wheel 31, is prevented from so doing. Thus, the pointer 34 remains in a position that indicates the highest demand for power that has traversed the circuit to which the instrument is connected.

When the contact piece on the arm 29 engages the pin 30, the circuit comprising the conductors 41 and 42, the winding of the electromagnet 43 and the battery 44 is completed to effect disengagement of the restraining device 56 from the gear wheel 48 and thus permit the gear wheel 48 to rotate to a position in which the spring 47 is free from tension, this position being such that the pointers 52, 53 and 54 indicate on a dial, the day of the month and hour and minute of the day. The clock shaft 46 will continue to drive the gear wheel 48 by the spring 47 until such time as the electrical energy to be measured becomes sufficiently reduced to cause the armature 5 to disengage the contact piece on the arm 29 from the pin 30. The disengagement of the contact piece on the arm 29 from the pin 31 interrupts the current traversing the electromagnet winding 43, and the spring 57 effects engagement of the restraining device 56 with the wheel 48. The restrained wheel 48 retains the pointers 52, 53 and 54 in the positions in which they indicate the time when the pointer 34 was in its maximum-demand position.

The clock shaft 46 will continue to rotate, storing up energy in the spring 47 until such time as the wheel 48 is again released. Then the pointers 52, 53 and 54 will be rotated an amount equivalent to the rotation of the shaft 46 since the last operation of the device 56 to thus indicate the time of the maximum demand.

At the end of a month or at the end of any meter-reading period, the pawl 38 may be disengaged from the ratchet wheel 31 to allow the spring 33 to move the pointer 34 to its initial position. This effects engagement of the contact arm 29 and the pin 30 which will cause the restraining device 56 to release the gear wheel 48 and thus allow the clock shaft 46 to operate the pointers 52, 53 and 54 until such time as the contact members 29 and 30 are again disengaged.

While I have shown my invention in a simple and preferred form, it is not so limited, but is capable of various modifications within the scope of the appended claims.

I claim as my invention:

1. In an electrical measuring instrument, the combination with an indicating maximum-demand meter, of a clock having a time indicating pointer adapted to be continuously connected to the clock, and means controlled by the said maximum-demand meter for controlling the operation of the said pointer to indicate the time of a maximum demand.

2. In an electrical measuring instrument, the combination with a maximum-demand meter and a clock, of a time-indicating device operatively connected to said clock, and means controlled by said maximum-demand meter for controlling the operation of said time-indicating device.

3. In a maximum-demand meter, the combination with a maximum-demand pointer and an operating mechanism therefor, of a clock mechanism, a time-indicating mechanism continuously and yieldingly connected to the said clock mechanism, and means controlled by the operation of the maximum-demand pointer and the said operating mechanism for controlling the operation of the said time-indicating mechanism.

4. In a maximum-demand meter, the combination with a maximum-demand pointer and an operating mechanism therefor, of a clock mechanism, a time-indicating mechanism resiliently connected to said clock mechanism, means for restraining the operation of said time-indicating mechanism, and means operatively connected to said pointer and said operating mechanism for controlling the said restraining means.

5. In a maximum-demand meter, the combination with a maximum-demand pointer and an operating mechanism therefor, of a clock mechanism, a time-indicating mechanism resiliently connected to said clock mechanism, electromagnetic means for restraining the operation of the said time-indicating mechanism, and electrical contact members operatively connected to said pointer and said operating mechanism for controlling the said electromagnetic means.

6. In a maximum-demand meter, the combination with a maximum-demand pointer and an electromagnetically operated mechanism therefor, of a clock mechanism, a time-indicating mechanism operated by said clock mechanism, and means controlled by said pointer and said operating mechanism for restraining the time-indicating mechanism.

7. In an electrical measuring instrument, the combination with a maximum-demand meter and a clock, of a time-indicating device resiliently connected to the clock, and means controlled by the maximum-demand meter for controlling the operation of the time-indicating device.

8. In an electrical measuring instrument, the combination with a maximum-demand meter and a clock, of a time-indicating device operatively connected to the clock, and means controlled by the said maximum-demand meter for restraining the operation of the time-indicating device.

In testimony whereof, I have hereunto subscribed my name this 25th day of Sept., 1914.

CLARENCE A. BODDIE.

Witnesses:
HORACE V. S. TAYLOR,
B. B. HINES.